Figure 1:
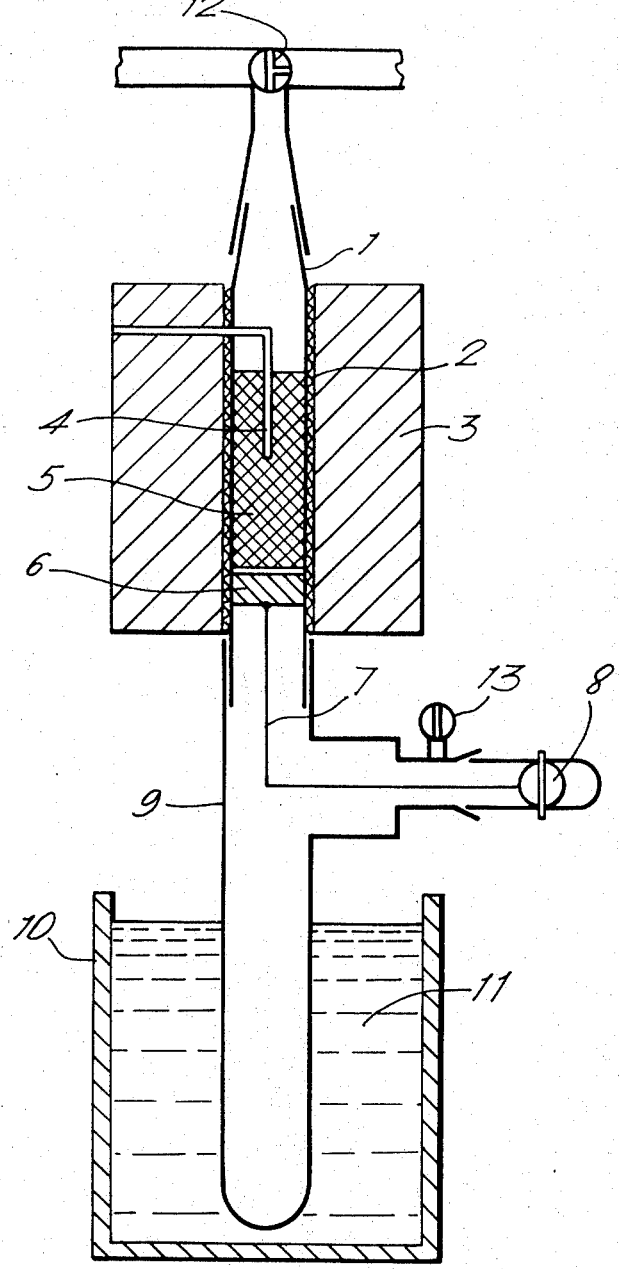

United States Patent [19]
Berg

[11] 3,769,776
[45] Nov. 6, 1973

[54] METHOD FOR THERMAL ACTIVATION OF A SURFACE ACTIVE MATERIAL

[75] Inventor: Ronald Berg, Oslo, Norway

[73] Assignee: Institutt for Atomenergi, Kjeller, Norway

[22] Filed: Feb. 22, 1972

[21] Appl. No.: 228,335

Related U.S. Application Data
[63] Continuation of Ser. No. 838,887, July 3, 1969, abandoned.

[52] U.S. Cl............................. 55/67, 55/74, 55/75
[51] Int. Cl............................................ B01d 15/08
[58] Field of Search ..................... 55/66, 67, 74, 75, 55/208, 386; 252/412, 455.2

[56] References Cited
UNITED STATES PATENTS

| | | | |
|---|---|---|---|
| 2,810,454 | 10/1957 | Jones et al. ............................. 55/66 |
| 3,335,550 | 8/1967 | Stern ...................................... 55/208 |
| 3,517,521 | 6/1970 | Emerson ............................. 55/66 X |
| 3,282,028 | 11/1966 | Bealin ..................................... 55/66 |

OTHER PUBLICATIONS

Cassidy, "Absorption and Chromatography", 1951, pp. 193 and 208–212.

Hoffmann et al., "Increased Sensitivity of a Thermal Conductivity Detector by Cryostatic Operations" in I. of G. C. May, 1966 pg. 198.

*Primary Examiner*—John Adee
*Attorney*—Watson, Cole, Grindle & Watson

[57] ABSTRACT

The present invention relates to a method for thermal activation of a surface active material, mainly for the purpose of increasing the gas sorption ability of the material. It is previously known to improve the sorption ability by heating the sorption agent to a temperature, preferably above 300° C and thereafter slowly cooling said agent to room temperature. According to the invention, however, the slow cooling is replaced by a quenching to a temperature below −75° C, for example, in liquid nitrogen or helium.

This activation method has proved to give more efficient sorption agents for several gases, but especially for nitrogen and xenon.

5 Claims, 2 Drawing Figures

METHOD FOR THERMAL ACTIVATION OF A SURFACE ACTIVE MATERIAL

This is a continuation of copending application Ser. No. 838,887, filed July 3, 1969 now abandoned.

The present invention concerns a method for thermal activation of a surface active material.

By activation sorption and surface properties of solids such as adsorption capacity and separation power for gases and vapours are modified.

According to the invention a method for thermal activation of a surface active material wherein the material is heated to a temperature above 300° C is characterized in that the heating is followed by quenching to a temperature below −75° C. According to a feature of the invention quenching is performed by submerging the surface active materials in a fluid.

Surface active materials are widely used in industrial processes. As an example can be mentioned drying whereby water is removed from liquids and gases. Separation of organic compounds should also be mentioned. Surface active materials are also used for dehydration. For example, it is known that when ethanol is contacted with activated bauxite, small quantities of ethylene are made even at such a low temperature as 24° C. Further, it is known that surface active materials have catalytic properties.

Sorption is of great importance in separation, analysis and collection of inert gases. The sorption agents most widely used for these purposes have been activated carbon and molecular sieves of the type Linde 4 A and 5 A. 4 A is made from sodium aluminum silicate and has a pore diameter of 4.2-4.75 A (Angstrom). 5 A is a calcium aluminum silicate with a pore diameter of 5.0-5.6 A. 5 A has a chemical constitution corresponding to chabasite, a natural zeolite with the formula $CaAl_2Si_4O_{12} \times 6\ H_2O$. Molecular sieves have a remarkable ability for selective adsorption of inert gases, especially at room temperature, and they have therefore been widely used for gas chromatography analysis of such gases. In particular, the ability of molecular sieves to separate oxygen, nitrogen, krypton, and xenon has been characteristic for this sorption agent.

In the literature, physical and chemical adsorption are often considered separately. In this patent application sorption is meant to cover both types of adsorption. Also the term gas is meant to cover even vapour.

It is known that krypton and xenon can be separated in columns with active carbon. Previous attempts to separate oxygen and nitrogen have given retention times of 8 and 17 seconds for oxygen and nitrogen respectively. Attempts to separate these gases by means of carbon have resulted in incomplete separation.

The other properties and the applications of surface active materials stem from their the large specific surface as well as the character of the surface forces. It is known that these materials quickly attract water. It is therefore of great importance to activate the surface active material in order to remove sorbed water so that the surface can be used for contacting materials that are to be sorbed, catalysed, etc.

Activation normally takes place by heating to a temperature of 200° – 300° C, by passing a hot gas, preferentially an inert gas such as nitrogen, along the surface of the sorption agent. The heating can also take place in vacuum. In the past activation is followed by slow cooling to room temperature.

Other activation methods are also previously known. Thus, activated carbon has been treated with molten potassium or sodium. In this way the sorption power for inert gases and organic vapours is enhanced. It is assumed that the reason is that modifications in the pore structure have occurred.

In the use of the method according to the present invention the sorption agent is heated to a temperature above normal activation temperature, whereafter it is subjected to quenching in, for example, liquid nitrogen or helium. This activation operation, which, for example, can take place in an atmosphere of air and inert gases, and in vacuum, has proved to be much more efficient than activation followed by slow cooling.

The gases used in the sorption measurements performed in connection with the present invention are nitrogen, oxygen and noble gases such as argon, krypton, and xenon. These gases, and especially krypton, xenon and oxygen are undesirable during the operation of nuclear reactors. Because of danger of corrosion, oxygen is undesired in the humid atmosphere in a boiling water reactor. Krypton and xenon cause production of radioactive fission products and in the case of leakage from a fuel element they will constitute a potential hazard for the surroundings of the reactor. These gases constitute also a potential hazard in reprocessing plants for irradiated fuel. As an example it may be mentioned that the release of krypton 85 during reprocessing will reach, it is estimated, 150,000 Curie/day in 1980. Surface active material activated according to the present invention can be used to achieve efficient retention of the radioactive isotopes of krypton and xenon.

The following surface active materials have by the activation method according to the invention obtained an improved ability to selective adsorption of argon, krypton, xenon, nitrogen and oxygen compared to the adsorption which is a result of ordinary activation:

Molecular sieves of the type Linde 4 A and 5 A.
Alumina.
"Florisil" which is the trade name of a granulate of $MgO$ and $SiO_2$.
Bauxite.

By use of the new activation method alumina, "Florisil" and bauxite have got separation properties equivalent to the molecular sieves Linde 4A and 5A. This was not possible by the previously known activation method. Results of separation of the gases mentioned above by gas chromatography at room temperature in a column filled with the sorption agents mentioned above are shown in Table I. The length of the column was 5 meter while the temperature of the column was 20° C.

In the table materials activated by the new method is marked A, activated by the ordinary method is marked B, while materials which have not been activated are marked C. A cross denotes that the gas appears in the chromatogram, while an arrow denotes that the gas is not separated or that it appears as a top in the chromatogram.

The separation ability of surface active materials can be examined advantageously by gas chromatography which is a quick separation method and which gives complete separation or isolation of the individual components in a gas mixture. In the present work adsorption gas chromatography is used. This methods makes use of the difference in sorption forces of the individual components in a gas mixture relative to the sorption agent. The gas mixture, the components of which is to be separated, are sent through a column filled with a sorption agent. Transport through the column takes place by means of a carrier gas, usually helium, which flows continuously through the column. Because of the difference in sorption forces of the individual components in the gas mixture, the gas components will get different migration velocities in the column. The time from the moment the gas mixture is entering the column until one component leaves the column is called the retention time for the component in question. The retention time, which can be recorded by means of a detector, is specific for each gaseous component. The retention time is also a measure for the sorption capacity for a given sorption agent for a given gas, since long retention time indicates large sorption capacity.

TABLE I

|   | A | O₂ | N₂ | Kr | Xe |
|---|---|----|----|----|----|
| A. Mol. sieve 5 A | X | X | X | X | X |
| B. Mol. sieve 5 A |   | → | X | X | X |
| C. Mol. sieve 5 A |   | ← |   | ← | → |
| A. Alumina |   |   | X | X | X |
| B. Alumina |   | ← | ← | ← | → |
| C. Alumina |   | ← |   |   | X |
| A. "Florisil" |   | → | X | X | X |
| B. "Florisil" |   | ← | → | ← | → |
| A. Bauxite |   | → | X | X | X |
| B. Bauxite |   | ← | → | ← | → |

An apparatus suitable for execution of the method according to the invention is shown in FIG. 1.

The furnace used for heating of the sorption agent consists of a silica tube surrounded by a heating coil (2) and insulation (3). A thermocouple (4) is positioned centrally in the tube (1). Through the upper opening of the tube (1) a sorption agent (5) is filled into the tube above a bottom layer of steel wool (6). The bottom layer can be withdrawn by means of a metallic wire (7) wound around a conical brass plug (8). The sorption agent (5) will then drop into a silica tube (9) the lower end of which is disposed in a container (10) filled with a liquidfied gas (11). Through the three-way valve (12) a gas can pass through the furnace and out of the valve (13). With the valve (12) is another position the furnace can be evacuated. In the following example the application of new activation method on a typical surface active material is described together with the gas chromatography measurements and the effects obtained.

Example:
60 grams of screened alumina with a particle size in the range 0.29–0.58 mm were placed in a vertical silica furnace. The oxide was heated for 6 hours in air at a temperature of 600° C and was thereafter quenched in liquid nitrogen. Heating and quenching took place in the apparatus described above. The quenched sample was heated slowly to room temperature in dry air and thereafter filled into a 5 m long glass column with an internal diameter of 4 mm. The material was vibrated in order to achieve a denser packing. The column was then connected to a gas chromatograph and helium with a plurality of 99.98% was admitted to flush the column for about 1 hour at a temperature of 22° C. Thereafter 546 $\mu$ 1 NTP of a gas mixture with the volumetric composition A: 17.4%, O₂: 20 percent, Kr: 21.6%, N₂: 20.5%, Xe: 20.5percent were injected into the column.

The other important conditions for the separation were:

| | |
|---|---|
| Type of gas chromatograph: | Carlo Erba. Analyt. Unit C |
| Column temperature: | 22°C |
| Column pressure: | 0.72 kg/cm² |
| Flowrate of carrier-gas: | 30 ml/min. |
| Detector type: | Heat conduction cell |
| Detector current: | 7.1 mA |
| Detector temperature: | 43.5°C |

Figure 2:
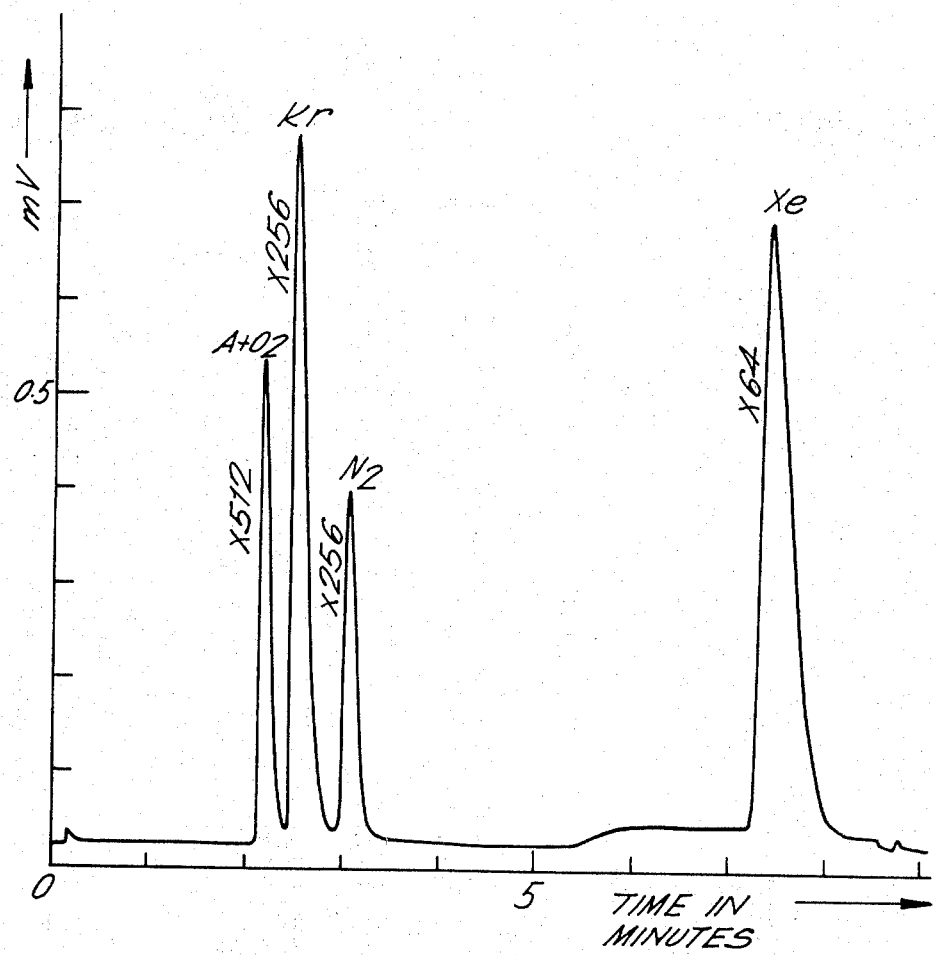

The resulting chromatogram is shown in FIG. 2. From the chromatogram it appears that the retention times for the various gases were:
A, O₂: 2.16 min.
Kr: 2.52 min.
N₂: 3.07 min.
Xe: 7.45 min.

It was also tried to quench the surface active material in water at 0° C and in air cooled to about −75° C by means of carbon dioxide ice. The other test conditions were as above. In the first case no quenching effect on the sorption properties of the surface active material could be observed, while quenching by means of carbon dioxide ice gave a very small but measurable effect as concerns the measured retention times.

The reciprocal forces between surface and gas molecules can be expressed by the differential adsorption enthalpy $\Delta H$. The enthalpy can be considered as a measure for the binding energy between gas molecule and surface. By adsorption of a certain gas volume the most active spots on the surface will be saturated with molecules. This will give the highest enthalpy. Further covering of the surface will occur at somewhat lower enthalpy until a monomolecular layer is obtained. Further adsorption will then take place in multimolecular layers with considerably lower enthalpy. If the enthalpy is plotted as a function of the adsorbed volume of gas, one will in very many cases get a curve with a high initial value for the enthalpy. The enthalpy will decrease with increasing gas volume until an abrupt bend downwards appears. This point indicates a monomolecular layer and is a measure for the monomolecular adsorption capacity.

The adsorption enthalpy for adsorbed gas can be calculated from measured retention differences at two different temperatures. The isothermal adsorption enthalpy is given by the equation:

$$\Delta H = R \, T_1 \cdot T_2/T_2 - T_1 \, \ln t_2/t_1$$

where
$\Delta H$ = adsorption enthalpy (kcal/mol)
$t_1$ = retention time at temperature $T_1$ (° K)
$t_2$ = retention time at temperature $T_2$ (° K)
R = gas constant In table II are shown some values from the professional literature for $\Delta H$. Molecular sieve Linde 13× in the table is made from sodium aluminum silicate and has a pore diameter of about 10 A.

Table III shows values for $\Delta H$ obtained by activation of the sorption agent according to the invention. The table also shows values for $\Delta H$ obtained by the previously known activation method.

The values for $\Delta H$ in the table are calculated on the basis of measured retention times for the gases at 0° C and 20° C. The measurements are repeated several times and average values are used.

It appears from the table that the sorption enthalpy shows an increase because of the new activation method. Especially the increase is large for nitrogen and xenon.

A comparison of retention times achieved by means of sorption agents activated by the known and the new method respectively are shown in Table IV.

TABLE II

| Sorption agent | Temp., °C. | Adsorption enthalpy ΔH (kcal./mol) | | | |
|---|---|---|---|---|---|
| | | A | $O_2$ | Kr | $N_2$ |
| Molecular sieve Linde 13 X | 25 | | | 3.7 | |
| Do | −100 | | | 4.0 | |
| Molecular sieve Linde 5 A | 22 | 1.5 | 2.0 | 3.2 | 4.2 |
| $\gamma$-$Al_2O_3$ | −173 to +200 | | 1.6 | | |

TABLE III

| Sorption agent | Activation method | ΔH (kcal./mol) | | | | |
|---|---|---|---|---|---|---|
| | | A | $O_2$ | $N_2$ | Kr | Xe |
| $Al_2O_3$ | Heat treatment for 2 hours in He at 196° C. Slow cooling. | 0.79 | 0.79 | 1.20 | 1.70 | 3.60 |
| $Al_2O_3$ | Heat treatment for 24 hours in air at 950° C. Quenching. | 0.80 | 0.80 | 3.63 | 1.60 | 5.00 |
| Molecular sieve Linde 5 A. | Heat treatment for 5 hours in He at 196° C. Slow cooling. | 1.61 | 2.48 | 4.40 | 3.60 | |
| Do | Heat treatment for 24 hours in air at 600° C. Slow cooling. | 2.22 | 2.44 | 5.01 | 3.84 | 5.23 |
| Do | Heat treatment for 24 hours in air at 610° C. Quenching. | 2.47 | 2.76 | 5.78 | | |

TABLE IV

| Sorption agent | Activation method | Column temp. (° C.) | Retention time (min.) | | | | |
|---|---|---|---|---|---|---|---|
| | | | A | $O_2$ | Kr | $N_2$ | Xe |
| $Al_2O_3$ | Heat treatment for 5 hours in He at 196° C. Slow cooling | 25 | 2.26 | 2.26 | 3.11 | 2.24 | 7.36 |
| $Al_2O_3$ | Heat treatment for 24 hours in air at 500° C. Quenching | 24 | 2.23 | 2.23 | 3.17 | 2.50 | 7.82 |
| $Al_2O_3$ | Heat treatment for 6 hours in air at 600° C. Quenching | 22 | 2.16 | 2.16 | 2.52 | 3.07 | 7.45 |
| $Al_2O_3$ | Heat treatment for 24 hours in air at 950° C. Quenching | 23 | 2.27 | 2.27 | 2.58 | 3.16 | 6.57 |
| Mol. sieve Linde 5 A | Heat treatment for 5 hours in He at 196° C. Slow cooling | 24 | 7.44 | 7.44 | 23.34 | 15.33 | |
| Do | Heat treatment for 5 hours in He at 500° C. Slow cooling | 22 | 5.90 | 5.90 | 15.82 | 18.18 | 120.07 |
| Do | Heat treatment for 5 hours in He at 580° C. Quenching | 27 | 6.87 | 7.60 | 21.85 | 34.84 | 142.04 |
| Do | Heat treatment for 5 hours in He at 660° C. Quenching | 22 | 7.12 | 7.91 | 23.23 | 38.31 | 165.04 |

I claim:

1. In a method of chromatographically separating at least two individual gas components initially flowing together in a mixed gas stream and selected from the group consisting of oxygen, nitrogen, argon, krypton and xenon, to present a product stream wherein each component of the stream is separated from the other components therein, the steps of:
   a. improving the selective adsorption characteristics of a surface active sorption agent selected from the group consisting of aluminas, bauxites, molecular sieves and granulates of MgO and $SiO_2$ by heating the sorption agent to a temperature between about 300° C and about 1000° C and thereafter quenching the hot agent to a temperature below about −75° C; and
   b. passing said mixed gas stream through an elongated passage means at least partly filled with said heated and quenched sorption agent at substantially room temperature, provided that when separation between oxygen and argon is required, the agent is a molecular sieve, to separate said components by retaining the same for different time intervals on said agent in the passage means.

2. A method as claimed in claim 1, wherein said gas components are selected from the group consisting of oxygen, nitrogen, krypton and xenon, and the sorption agent is an alumina which has been heated to a temperature between about 600° C and about 950° C, and has been subsequently quenched in liquid nitrogen.

3. A method as claimed in claim 1, wherein the sorption agent is molecular sieve 5A which has been heated to a temperature between about 500° C and about 700° C, and has been subsequently quenched in liquid nitrogen.

4. A method as claimed in claim 1, wherein said gas components are selected from the group consisting of oxygen, nitrogen, krypton and xenon, and the sorption agent is a granulate of MgO and $SiO_2$ which has been heated to a temperature between about 300° C and about 600° C, and has been subsequently quenched in liquid nitrogen.

5. A method as claimed in claim 1, wherein said gas components are selected from the group consisting of oxygen, nitrogen, krypton and xenon, and the sorption agent is a bauxite which has been heated to a temperature between about 300° C and about 800° C and has been subsequently quenched in liquid nitrogen.

* * * * *